March 4, 1969  YOSHIO KATSUDA  3,431,393
APPARATUS FOR VAPORIZING CHEMICALS AND PERFUMES BY HEATING
Filed Sept. 7, 1965  Sheet 1 of 3

INVENTOR
Yoshio Katsuda

BY *Rommel, Allison of Rommel*
ATTORNEYS

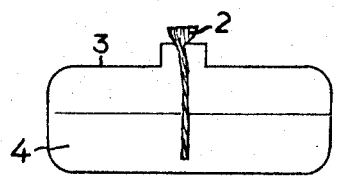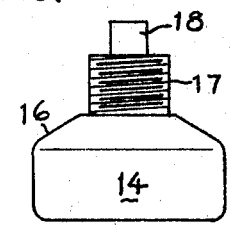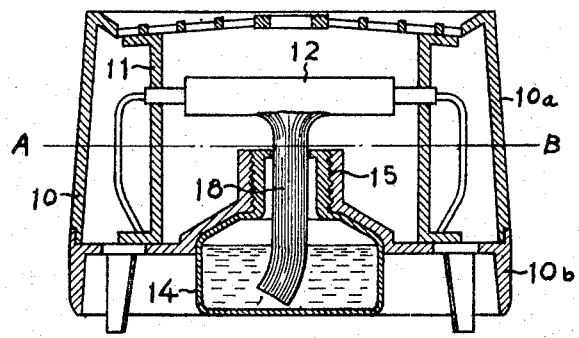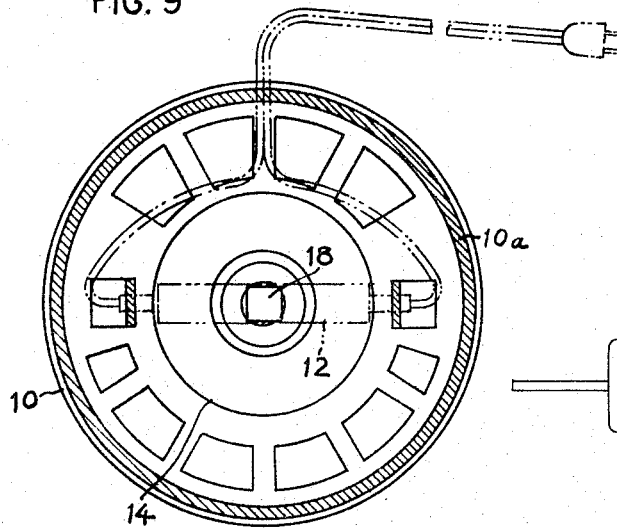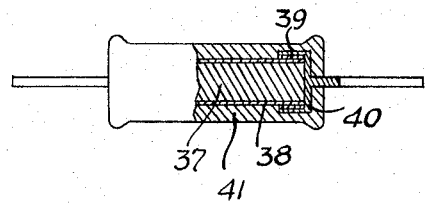

March 4, 1969  YOSHIO KATSUDA  3,431,393
APPARATUS FOR VAPORIZING CHEMICALS AND PERFUMES BY HEATING
Filed Sept. 7, 1965  Sheet 3 of 3

INVENTOR
Yoshio Katsuda

BY *Rommel, Allwine & Rommel*

ATTORNEYS

United States Patent Office 3,431,393
Patented Mar. 4, 1969

3,431,393
APPARATUS FOR VAPORIZING CHEMICALS AND PERFUMES BY HEATING
Yoshio Katsuda, Osaka, Japan, assignor to Dainihon Jochugiku Company, Limited, Osaka, Japan, a corporation of Japan
Filed Sept. 7, 1965, Ser. No. 485,509
U.S. Cl. 219—274                3 Claims
Int. Cl. F22b *3/00;* B01d *1/00*

ABSTRACT OF THE DISCLOSURE

A wick-type thermo-vaporizer includes a vented housing which covers a removable receptacle for a suitable liquid to be vaporized and a heater for the liquid, with a wick in contact with the liquid and supported by the neck of the receptacle, preferably to press, at one end face, upon the heater. A bridge across the housing carries the support for the heater and means to couple the receptacle to the housing.

This invention relates to an apparatus for thermal vaporization of compositions of matter such as insecticidal, fungicidal, repellent, deorodiferous and or perfuming chemicals.

The object of this invention is to provide apparatus of the class mentioned above, in which very little active ingredients is lost in heating, constant effect is prolonged so long as the composition of matter in solution is left, there is no degradation with the lapse of time, the amount of solution in the apparatus reservoir is discerned visibly and at the same time the degree of vaporation can freely be controlled Other objects and advantages of the invention will become apparent during the course of the following detailed description, taken in connection with the accompanying drawings, forming a portion of this specification, and in which drawings:

FIG. 7 is a schematic view of a receptacle for chemicals with a vaporator therein.

FIG. 8 is a vertical sectional view of a second embodiment of apparatus of this invention.

FIG. 9 is a horizontal sectional view of the apparatus, taken substantially on the line A–B of FIG. 8.

FIG. 10 is a front elevational view of the receptacle for chemicals of FIGS. 8 and 9.

Figure 11:
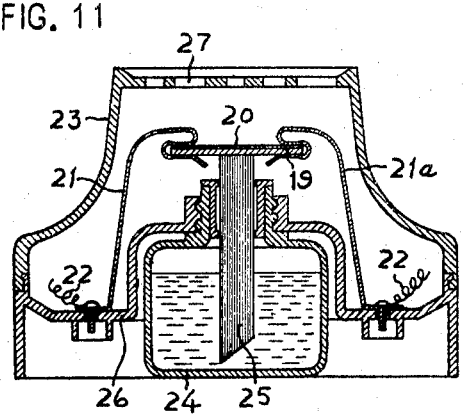
FIG. 11 is a vertical sectional view of the apparatus of another embodiment of the invention.

FIGS. 13 to 17 inclusive are fragmentary vertical sectional views of modifications of the showing in FIG. 11 of the wall structure of the heater thereof.

FIG. 18 is a fragmentary vertical sectional view of a further modification of the heater structure of the invention.

An apparatus under this invention consists of an electric conductive heater, a receptacle of chemical or perfume solution and vaporator of solution, in which the solution is heated and vaporated, the solution being supplied, continuously through capillary attraction to the vaporator in contact with the heater. In the preferred construction, electric conductive heater is held in the apparatus which is freely ventilated, and under its bottom a receptacle of chemical or perfume solution is disposed so as to be freely inserted or removed, a vaporator, that is, a wick is disposed partly within the receptacle to cause ascent of the solution, this vaporator being in intimate contact with the heater. (This is called the first style hereinafter.)

The heater devised by me is one of wire wound resistance, platinum catalyst, and benzine. As for vaporator, it may be of fiber, asbestos, diatomaceous earth and the like in tape or board forms. Solutions can be supplied to vaporator with one end portion of the latter dipped in the solution or associated with some other suitable material capable to draw up liquid. The receptacles for solutions may have either one end of vaporator dipped in the solution introduced therein by the operator or, for example, reserve receptacles of solution may be substituted as desired.

As active ingredient to be used in this apparatus are such which are easily vaporated when heated: pyrethroide insecticides such as pyrethrine; allethrin chlorinated insecticides such as lindane, DDT; organic phosphoric insecticides such as DDVP or diazinone; sunuthion fungicides such as Formalin or cresol; organic sulfuric fungicides such as 1,2,5 trithracyclo-helpadiene or 3,4,6,7 tetranitrile organic mercuric fungicides; insect repellents such, as diethyltoluamide; deodorants, such as lauryl metaacylate perfumes, such as musk, clove oil or rose.

Solutions to be used in this apparatus is a mixture of two or more than two of the above-mentioned materials dissolved in petroleum, alcohol or ether. Some examples of solution are shown below. (Figures showing each weight in grams.)

Example 1

| | |
|---|---|
| Alcohol (or petroleum) | 100 |
| Butyl cresol | 0.05 |
| Perfume | 1 |
| DHC (or DDT) | 0.2 |
| Synepirin | 1 |
| Colouring matter (optional) | 0.8 |
| Lauryl metaacrylate (deodorant) | 1 |

Example 2

| | |
|---|---|
| Allethrin | 3 |
| Piperonylbutoxide or octachloride propylether (Synergist) | 1.5 |
| Petroleum | 100 |

After the chemicals are mixed and dissolved, the mixture thereof is ready for use.

In the drawings similar reference characters designate corresponding parts throughout the several views. The heater means 1 of FIG. 1 preferably comprises a glass-and-oxide coated metal plate, as of iron, interposed in an electric circuit. In the preparation of this heater, an iron plate cleaned with acid and/or alkali, is covered with impalpable glass powder and heated at a desired temperature above 1200° C. in a high-temperature furnace and keeping the glass-coated plate at between 450° C.–750° C., a solution of $SnCl_4$ in solution is sprayed over the glass coating. Instead of the tin, metallic chlorides of Sb, Zn, Cd, Fe, V, Cu, Ni, Mn may be substituted. The solvent may be water, methanol or acetic acid. It is desirable that an additional spray coating of the chloride is reapplied and heat-treated, upon which the greater part of metallic chloride is oxidized. Then conductive metal termini are attached to the metal plate. Obviously, the plate may be flat, shaped into a cylinder or tubular, for example. The heater 1 may be supported in any approved way such as by a holder or brackets such as of hard glass, tiles, and other ceramics, minerals, and plastics, such as polycarbonate, polypropylene, polyethylchloride, silicone resin, fluorine-contained resin.

The apparatus also includes, associated with the heater 1, an elongate vaporator 2, such as of asbestos, one portion thereof being wound around the heater means 1 in spaced-apart turns, with the other end portion being disposed within a receptacle 3 and with the terminal part of this other end portion being immersed in the selected solution 4 to be vaporized. This receptacle may be a glass or other material jar, substantially as shown in FIG. 1.

Figure 1:
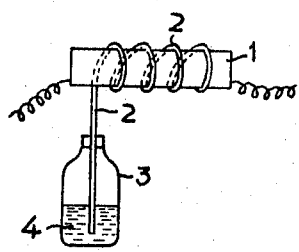
FIG. 1 is a schematic view of an apparatus of the invention in which a vaporator is heated directed by a heater.

Vaporization of the solutions as per Examples 1 and 2, generally take place between 60° and 90° C., using the apparatus of FIG. 1 by way of example.

Figure 2:
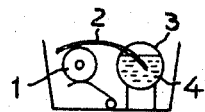
FIG. 2 is a schematic view in which the vaporator is heated indirectly by the heater.

The form of invention shown in FIG. 2 preferably comprises a heater means 1 substantially circular in transverse section, a tubular receptacle 3 and a vaporator 2 dipping into the solution 4 in the receptacle 3 and extending over the heater 1. Vaporization of the solutions as per Examples 1 and 2 will take place, as a general thing, between 60° and 90° C. employing the apparatus of FIG. 1, and 80° and 110° C. employing the apparatus of FIG. 2 (as well as those of FIGS. 3, 5 and 6).

Figure 3:
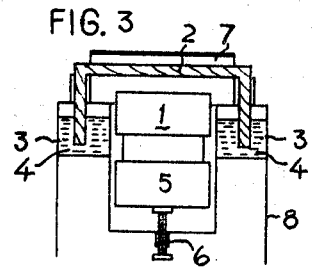
FIG. 3 is a vertical sectional view of an embodiment of the invention in which the heater can be raised and lowered.
Figure 4:
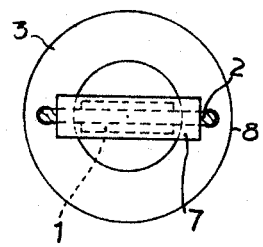
FIG. 4 is a top plan view of the same.

In FIGS. 3 and 4, the heater means 10 is disposed inwardly of the receptacle 3 with the vaporator 2 having both its end portions within the solution 4 in the receptacle 3 and extending over the heater 10. A support 5 is provided carrying means 6 for adjusting the distance between the heater means 10 and portion of the vaporator 2 directly above it. The means 6 may be a screw with its free end bearing against the bottom of the heater 10 and rotatably carried by the apparatus housing (not shown in detail).

Figure 5:
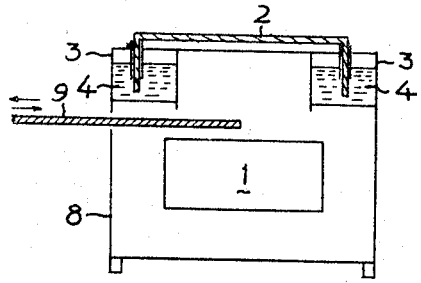
FIGS. 5 and 6 are schematic views of embodiments of the invention showing dampers between the heater and evaporator.

The apparatus of FIG. 5 comprises the heater 1, receptacle 3, which may be substantially like the receptacle 3, vaporator 2 disposed substantially as the vaporator 2 and a reciprocal, horizontally-disposed damper 9 which may be slidably carried by the apparatus housing and with appropriate portion thereof interposed between the heater and vaporator above the heater.

Figure 6:
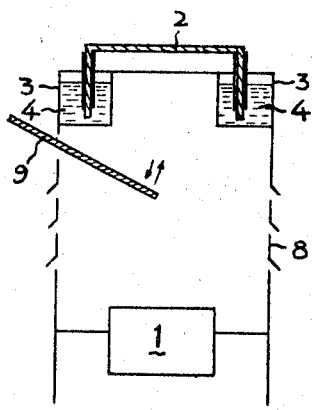

The arrangement in FIG. 6 contemplates the damper 9 slidably disposed at a suitable angle between the heater 1 and receptacle 3 containing the solution 4, and the damper may be tipped so that its inner end portion is suitably positioned, for efficient use, in juxtaposition with the heater 1.

FIG. 7 comprises a receptacle 3 which contains the solution 4 which may replace the receptacle 3 of FIG. 2, with one end portion of the vaporator 2 projecting through the upwardly-opening mouth of the receptacle 3. This receptacle 3 contemplates a stock receptacle, already filled with solution 4 which may replace an empty receptacle 3 which had contained solution 4 depleted by the apparatus.

FIGS. 8, 9 and 10 illustrate a form of the apparatus of the invention wherein a housing 10 (which may be employed in connection with the apparatus schematically shown in the prior FIGURES 1–7) has a dome portion 10a and a skirt portion 10b with an upwardly-extending support wall 11 for the horizontally-disposed heater 12. The dome is provided at its upper end with a conventional grating for the flow of the vaporized solution in the receptacle 14 out of the screw-threaded collar 17 of which projects the upper end portion of a vaporator 18 with the remainder of the vaporator within the receptacle, all substantially as shown in FIG. 8. It will be seen there that the terminal of the vaporator is in contact with the heater 12 although it may be spaced slightly from the heater if desired. A shoulder 16 of the receptacle 14 abuts a substantially horizontal wall or bridge of the housing 10 this wall having an upwardly-extending screw-threaded collar portion, the screw threads of which mate with those of the collar 17 for attachment of the neck of receptacle to the housing 10. The mouth of the neck is restricted in circumference with the vaporator 18 in contact with the wall of the mouth as in FIGS. 8 and 10.

Figure 12:
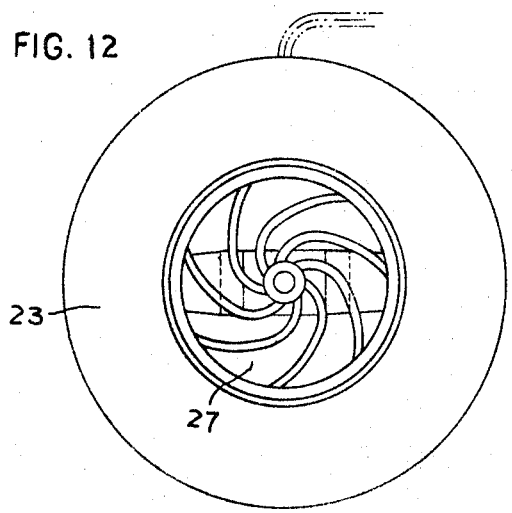
FIG. 12 is a top plan view of FIG. 11.
Figure 13:
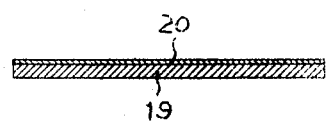
Figure 14:
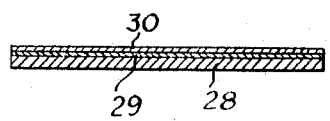

FIGS. 11, 12 and 13 illustrate a further modification of the apparatus of the invention wherein the heater is a conventional hard glass or ceramics support or holder 19 for an electrical resistance 20 in circuit with the terminals 21–21a of the conductors 22—22. The electrical resistance 20 is adapted, of course, to emit infra red rays and comprises a pyrogemine semi-conductive layer, such as of antimony oxide or stannous oxide. It will be noted in FIG. 11 that the resistance 19 may be clipped onto the terminals 21a. The housing 23 includes the upper grating 27, a wall 26 somewhat like the wall shown in FIG. 8 for supporting the receptacle 24 substantially as is the receptacle 14 while the upper end portion of the vaporator 25 projects from the mouth of the receptacle 24 to contact the resistance, and dips into the solution within the receptacle. An electrical resistance value of 6500–7500 ohms, is suggested, with temperatures between 90° C. and 120° C.

Modifications of the heater of FIGS. 11–13 may comprise, by way of example, those heaters of FIGS. 14–17. The heater of FIG. 14 comprises a support or holder 28 of unglazed pottery, for the semi-conductive layer 29 such as of carbon topped by a covering 30 such as hard glass.

Figure 15:
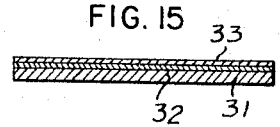

FIG. 15 discloses a heater in which there is a metal plate support or holder 31, a layer of insular heat-resistant material 32 such as hard glass, and a pyrogenic semi-conductive infra red-rays emitting layer 33.

Figure 16:
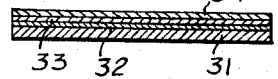
Figure 17:
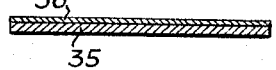

In FIG. 16, the heater is laminated as shown in FIG. 15 but the elements thereof are designated as 31, 32 and 33, and a protective layer 34 of insular heat-resistant material tops the layer 33, while in FIG. 17 the heater comprises a plastic plate of pyrogenic semi-conductive infra-red rays-emitting material topped by a layer of heat-resistant glass.

FIG. 18 is a heater modification of a cylindrical-shaped support 37 of heat-resistant material, with a pyrogenic semi-conductive layer 38, and an outer covering 41 of heat-resistant material such as glass, with electrodes 39 and electric terminals 40 electrically connected with the layer 38.

The following is the results of insecticidal experiments as detailed below, employing the solution of Example 2, and noting the 50% knocked down time and death rate of two hours thereafter, according to the different distances between vaporator 2b and heater 1b in the center of two glass cases, one 60 cm.$^3$ and the other 100 cm.$^3$ with twenty *Culex pipiens* pallens coguillets put in beforehand, the insects being *Musca domestica vincina* and *Blattella germanica*, by way of example. Other experiments, employing the apparatus of FIG. 5 yielded equally desirable results.

| Size of glass case | Distance between vaporator and heater, mm. | Time | KT-50, relative effectiveness | Killed after 2 hrs. percent |
|---|---|---|---|---|
| 60 cm.$^3$ | 3 | 8'14'' | 1.00 | 100 |
|  | 2 | 6'52'' | 1.20 | 100 |
|  | 1 | 5'25'' | 1.52 | 100 |
| 100 cm.$^3$ | 3 | 25'13'' | 1.00 | 100 |
|  | 2 | 22'07'' | 1.14 | 100 |
|  | 1 | 18'58'' | 1.33 | 100 |

In further studying the influence of heat given off by the pyrogenic infra red-rays emitting semiconductors upon the chemicals, use of these semiconductors as heaters permits infra red rays to penetrate into the solution upon the vaporators so as to heat the solution materials evenly from within, the necessary amount of active ingredients to be heated and vaporated being very small (for example, to heat and vaporate allethrine, about 1 mg. per 3 m.$^3$ per hour), susceptibility to heat is very delicate and rate of decomposition varies with quality of heat when heated up to the same temperature.

What is claimed is:

1. An electro-thermal vaporizer in combination with a liquid composition of matter for vaporization thereby, said apparatus consisting of support means including a skirt portion having a circumferential wall, an upper edge to said wall and a substantially horizontal bridge spanning said wall, provided with a central opening, and an upstanding collar surrounding said opening; said support means also including a dome portion having a lower edge disposed upon said upper edge and adjacent portions of said bridge, and provided with an exhaust port in the wall of said dome; an electric heater having a housing; a receptacle for containing said composition of matter, both being carried by said support means and in juxtaposition one with the other said receptacle having a neck portion and an outer mouth less in circumference than the interior circumference of said neck, with said neck disposed within said collar, the vertical plane of said neck intersecting said housing of said heater; capillary attraction means for drawing said composition of matter from said receptacle to within the heating zone of said heater, said capillary attraction means being supported by the wall of said mouth, and extending into said receptacle and said composition of matter therein, through said mouth and into said zone; and electric current carrying means, electrically connected with said heater, and carried thereby and by said support means.

2. An electro-thermal vaporizer in combination as in claim 1 characterized in that said upstanding collar is interiorly screw-threaded and said neck has exterior screw threads mating with the screw threads of said collar; said bridge having a downwardly-opening concavity; and said receptacle having an upwardly extending wall portion disposed within said concavity.

3. An electro-thermal vaporizer in combination as in claim 1 characterized in that said capillary attraction means is a wick having an upper end face and said face is in pressure contact with said housing of said heater.

References Cited

UNITED STATES PATENTS

| 1,154,113 | 9/1915 | Hadaway | 219—274 |
| 1,163,657 | 12/1915 | Hadaway | 219—274 X |
| 1,727,899 | 9/1929 | Odlum | 219—274 |
| 1,944,821 | 1/1934 | Blaise | 219—274 |
| 2,461,664 | 2/1949 | Smith | 219—274 X |
| 2,597,195 | 5/1952 | Smith | 219—274 X |
| 2,640,904 | 6/1953 | Gaiser | 219—203 X |

RICHARD M. WOOD, *Primary Examiner.*

C. L. ALBRITTON, *Assistant Examiner.*

U.S. Cl. X.R.

21—119; 128—192; 239—57; 261—99, 142